(12) United States Patent
Chang

(10) Patent No.: US 9,542,057 B2
(45) Date of Patent: Jan. 10, 2017

(54) WIRING STRUCTURE AND DISPLAY PANEL HAVING THE SAME

(71) Applicant: Shenzhen China Star Optoelectronics Technology Co., Ltd., Guangdong (CN)

(72) Inventor: Chun Kai Chang, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 104 days.

(21) Appl. No.: 14/417,245

(22) PCT Filed: Oct. 20, 2014

(86) PCT No.: PCT/CN2014/088899
§ 371 (c)(1),
(2) Date: Jan. 26, 2015

(87) PCT Pub. No.: WO2016/058191
PCT Pub. Date: Apr. 21, 2016

(65) Prior Publication Data
US 2016/0109990 A1  Apr. 21, 2016

(30) Foreign Application Priority Data
Oct. 16, 2014  (CN) .......................... 2014 1 0548617

(51) Int. Cl.
*G06F 3/047* (2006.01)
*G06F 3/041* (2006.01)
(Continued)

(52) U.S. Cl.
CPC ............. *G06F 3/047* (2013.01); *G06F 3/0412* (2013.01); *G06F 3/0416* (2013.01); *G09G 3/006* (2013.01);
(Continued)

(58) Field of Classification Search
CPC ........ G06F 3/047; G06F 3/006; G06F 3/3611; G06F 3/3607; G06F 3/0416; G06F 3/0412; G06F 2300/0426; G06F 2203/04103
See application file for complete search history.

(56) References Cited

U.S. PATENT DOCUMENTS

| 6,337,722 B1 | 1/2002 | Ha |
| 2002/0070750 A1 | 6/2002 | Fujita |

(Continued)

FOREIGN PATENT DOCUMENTS

| CN | 1357871 | 7/2002 |
| CN | 1495498 | 5/2004 |

(Continued)

*Primary Examiner* — Alexander Eisen
*Assistant Examiner* — Abhishek Sarma

(57) ABSTRACT

A wiring structure and a display panel are provided, and have red, green, and blue (RGB) signal lines; three signal control lines; and a switching line having a switching transistor disposed thereon. Each of the RGB lines has a terminal connecting correspondingly to the switching transistor, and connects correspondingly with the signal control lines through the switching transistor. The switching transistor comprises a control terminal for receiving a control signal, and controls the connection or disconnection between the three signal control lines and the RGB lines according to the control signal. The wiring structure can be used as an inspection system for the display panel.

9 Claims, 4 Drawing Sheets

(51) Int. Cl.
*G09G 3/36* (2006.01)
*G09G 3/00* (2006.01)

(52) U.S. Cl.
CPC ........... *G09G 3/3607* (2013.01); *G09G 3/3611* (2013.01); *G06F 2203/04103* (2013.01); *G09G 2300/0426* (2013.01)

(56) References Cited

U.S. PATENT DOCUMENTS

| | | | |
|---|---|---|---|
| 2004/0017531 A1* | 1/2004 | Nagata | G02F 1/1309 349/139 |
| 2004/0119925 A1 | 6/2004 | Moon | |
| 2014/0017531 A1 | 1/2014 | Uehara et al. | |
| 2014/0285462 A1* | 9/2014 | Lee | G09G 3/3648 345/173 |
| 2015/0077681 A1 | 3/2015 | Li | |

FOREIGN PATENT DOCUMENTS

| | | |
|---|---|---|
| CN | 101241281 | 8/2008 |
| CN | 101315472 | 12/2008 |
| CN | 102692774 | 9/2012 |
| KR | 20060017312 | 2/2006 |

\* cited by examiner

WIRING STRUCTURE AND DISPLAY PANEL HAVING THE SAME

CROSS REFERENCE TO RELATED APPLICATIONS

This application is a National Phase of PCT Patent Application No. PCT/CN2014/088899 having International filing date of Oct. 20, 2014, which claims the benefit of priority of Chinese Patent Application No. 201410548617.7 filed on Oct. 16, 2014. The contents of the above applications are all incorporated by reference as if fully set forth herein in their entirety.

FIELD OF THE INVENTION

The present invention relates to a display panel, and more particularly to a wiring structure and a display panel having the same.

BACKGROUND OF THE INVENTION

A liquid crystal display (LCD) has many advantages such as a thin body, saving power, no radiation, etc., and allows for broad applications. In the current market, most LCDs are backlight LCDs, and a backlight LCD comprises a liquid crystal panel and a backlight module. The working principle of the liquid crystal panel is that disposing liquid crystal molecules between two parallel glass substrates, changing the directions of the liquid crystal molecules by applying an electric field to circuits of the glass substrates so that the light from the backlight module is refracted to generate images.

In current technology, the liquid crystal display panel needs to be inspected for the yield rate by means of a short bar technology before the liquid crystal display device is assembled, so as to inspect whether the liquid crystal display panel has defective pixels (MURA) or bright dots (DIT/LINE) by means of the short bar technology. For example, at a data side of the structure, each of the signal lines 11 (i.e. R/G/B signal lines) is correspondingly connected to each of the test lines 12 through ITO (Indium tin oxide). After connecting, the test lines 12 can be introduced outward to connect with the corresponding probe 13 for yield inspection, as shown in FIG. 1a. After inspecting, the LCD signal lines 11 are cut off by laser so as to disconnect from the test lines 12, i.e. disconnect from the inspection system, as shown in FIG. 1b. After completing the yield rate inspection, the signal lines 11 are soldered within a bonding area 14, and then the display panel can be operated normally.

In practice, however, the current inspection system is discarded after completing a yield rate inspection so that the production cost is increased.

SUMMARY OF THE INVENTION

An object of the present invention is to provide a wiring structure and a display panel for reducing production cost.

To solve the above problem, the present invention provides a technical solution as follows:

A wiring structure for a display panel, which comprises RGB signal lines; three signal control lines; and a switching line including a semiconductor layer, wherein a switching transistor is disposed on the semiconductor layer; wherein each of the RGB signal lines has a terminal connected to the switching transistor, and correspondingly connected to the signal control lines through the switching transistor; wherein the switching transistor comprises a control terminal for receiving a control signal, and controls a connection or a disconnection between the three signal control lines and the RBG signal lines according to the control signal; wherein, in inspecting the display panel by using the wiring structure, the signal control lines are used for receiving a test signal when the signal control lines are connected to the RGB signal lines, and then the signal control lines perform a test on the RGB signal lines connected thereto according to the test signal.

In the abovementioned wiring structure, in controlling a touch panel by using the wiring structure, the RGB signal lines are used for receiving and transmitting a touch signal so that the touch signal feeds back the signal control lines when the signal control lines are connected to the RGB signal lines, and pixels are disconnected to a thin film transistor in the display panel.

In the abovementioned wiring structure, the switching transistor is a thin film transistor or a metal-oxide-semiconductor field-effect transistor.

To solve the above problem, the present invention provides another technical solution as follows:

A wiring structure for a display panel, which comprises RGB signal lines; three signal control lines; and a switching line having a switching transistor disposed thereon; wherein each of the RGB signal lines has a terminal connected to the switching transistor, and correspondingly connected to the signal control lines through the switching transistor; wherein the switching transistor comprises a control terminal for receiving a control signal, and controls a connection or a disconnection between the three signal control lines and the RBG signal lines according to the control signal.

In the abovementioned wiring structure, in inspecting the display panel by using the wiring structure, the signal control lines are used for receiving a test signal when the signal control lines are connected to the RGB signal lines, and then the signal control lines perform a test on the RGB signal lines connected thereto according to the test signal.

In the abovementioned wiring structure, in controlling a touch panel by using the wiring structure, the RGB signal lines are used for receiving and transmitting a touch signal so that the touch signal feeds back the signal control lines when the signal control lines are connected to the RGB signal lines, and pixels are disconnected to a thin film transistor in the display panel.

In the abovementioned wiring structure, the switching line includes a semiconductor layer, and the switching transistor is disposed on the semiconductor layer.

In the abovementioned wiring structure, the switching transistor is a thin film transistor or a metal-oxide-semiconductor field-effect transistor.

To solve the above problem, the present invention provides a further technical solution as follows:

A display panel having a wiring structure comprising RGB signal lines; three signal control lines; and a switching line having a switching transistor disposed thereon; wherein each of the RGB signal lines has a terminal connected to the switching transistor, and correspondingly connected with the signal control lines through the switching transistor; wherein the switching transistor comprises a control terminal for receiving a control signal, and controls a connection or a disconnection between the three signal control lines and the RGB signal lines according to the control signal.

In the abovementioned display panel, in inspecting the display panel by using the wiring structure, the signal control lines are used for receiving a test signal when the signal control lines are connected to the RGB signal lines, and then the signal control lines perform a test on the RGB signal lines connected thereto according to the test signal.

In the abovementioned display panel, in controlling a touch panel by using the wiring structure, the RGB signal lines are used for receiving and transmitting a touch signal so that the touch signal feeds back the signal control lines when the signal control lines are connected to the RGB signal lines, and pixels are disconnected to a thin film transistor in the display panel.

In the abovementioned display panel, the switching line includes a semiconductor layer, and the switching transistor is disposed on the semiconductor layer.

In the abovementioned display panel, the switching transistor is a thin film transistor or a metal-oxide-semiconductor field-effect transistor.

Compared with the prior art, the present invention provides a wiring structure and a display panel based on the current inspection system, comprising a switching line having a switching transistor disposed thereon. Through the switching transistor, the connection and the disconnection between the signal control lines and the corresponding signal lines are controlled. When the wiring structure is used as an inspection system, the step of cutting off the signal lines is canceled, and the wiring structure can be reused so that the manufacturing cost is greatly reduced and the wiring structure is very convenient.

BRIEF DESCRIPTION OF THE DRAWINGS

The following embodiments are referring to the accompanying drawings for exemplifying specific implementable embodiments of the present invention, and for making the technical solution and the benefits of the present invention easily understood.

DETAILED DESCRIPTION OF THE PREFERRED EMBODIMENTS

Figure 1A:
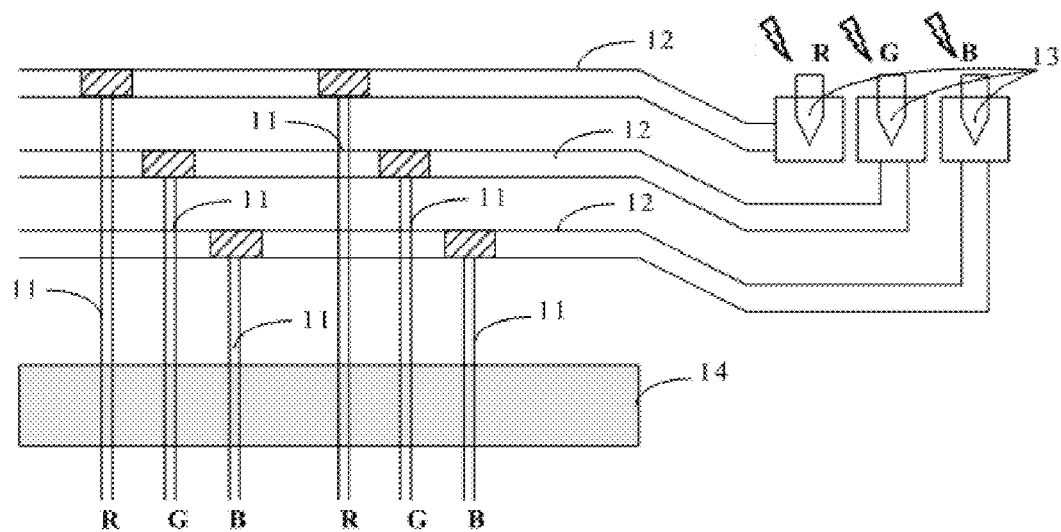
FIGS. 1a-1b are schematic views according to an inspection system used for a display panel in the prior art.

Please refer to the drawings, like reference numerals designate like elements throughout the specification. The principle of the present invention is described by the embodiments in suitable operation conditions. The drawings and description are to be regarded as illustrative in nature and not restrictive.

Figure 2:
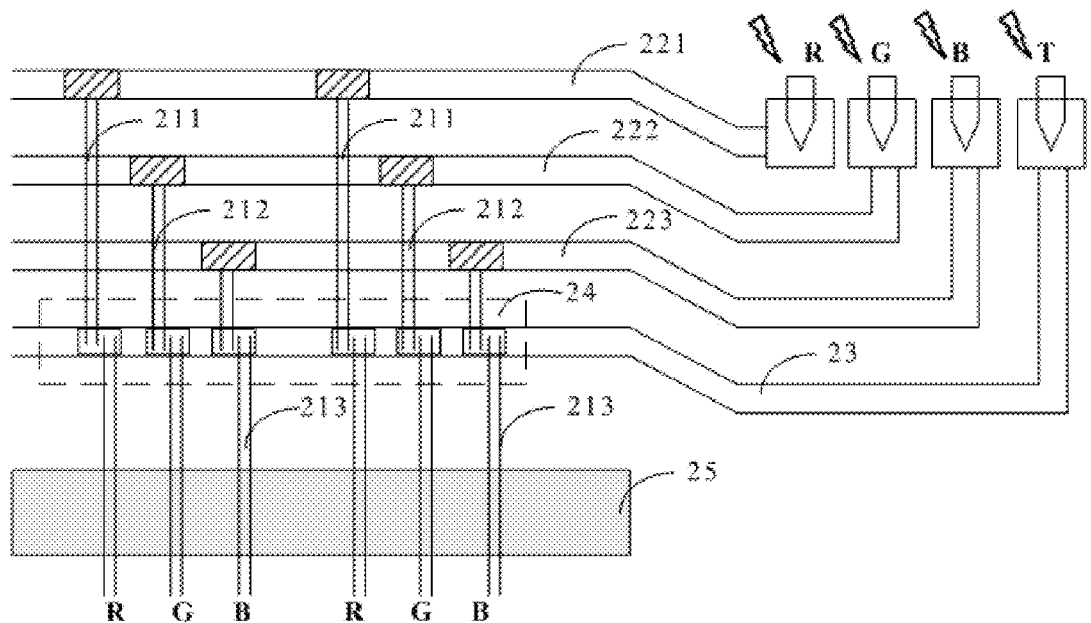
FIG. 2 is a schematic view of a wiring structure according to one embodiment of the present invention.

Please refer to FIG. 2, which is a schematic view of a wiring structure according to one embodiment of the present invention. The wiring structure comprises:

Red, green, and blue (R/G/B) signal lines, three signal control lines, and a switching line 23 having a switching transistor 24 disposed thereon;

Wherein each of the RGB signal lines has a terminal connecting correspondingly to the switching transistor 24, and correspondingly connects with the signal control lines through the switching transistor 24;

The switching transistor 24 comprises a control terminal for receiving a control signal, and controls the connection or disconnection between the three signal control lines and the RBG lines according to the control signal.

As shown in FIG. 2, numeral 211 represents the R signal lines, numeral 212 represents the G signal lines, and numeral 213 represents the B signal lines. Because each of the signal lines connects with the signal control lines through the switching transistor 24, correspondingly, the signal control line 221 connects to the R signal line, the signal control line 222 connects to the G signal line, and the signal control line 223 connects to the B signal line.

It should be understood that the red, green, and blue signal lines are connected to the corresponding signal control lines by indium tin oxide ITO. Additionally, the switching transistor 24 can be a thin film transistor (TFT) or a metal-oxide-semiconductor field-effect transistor (MOSFET) in one embodiment of the present invention, but it is not limited thereto.

Preferably, the switching line 23 has a semiconductor layer disposed thereon, and the switching transistor 24 is disposed on the semiconductor layer. More preferably, the switching transistor 24 is a TFT transistor, and the switching line 23 may be simply referred to as T line. The TFT transistor comprises a control terminal, an input terminal, and an output terminal. The switching line 23 inputs a control signal to the control terminal of each TFT transistor, and controls the connection and/or disconnection between the input terminal and the output terminal according to the control signal.

It is easy to understand that the connecting relationship between the control terminal, the input terminal, and the output terminal of the switching transistor 24 is not limited specifically. Any of the configurations can be adopted as long as the connection between the signal control lines and the signal lines can be achieved by conducting the input and the output terminal, or the disconnection between the signal control lines and the signal lines can be achieved by disconnecting the input and the output terminal according to the control signal received by the control terminal.

Figure 1B:
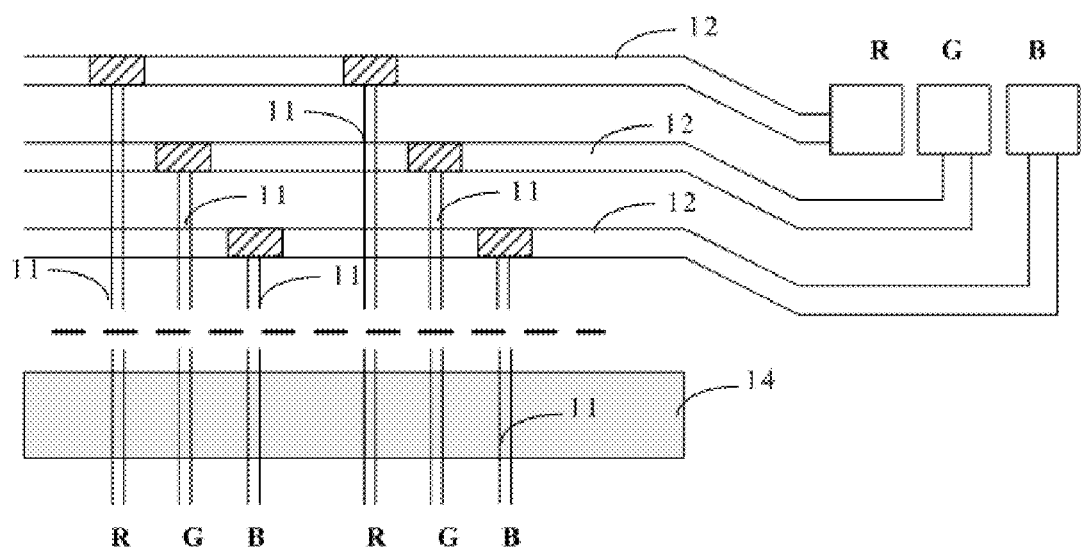

It should be understood that the wiring structure according to the present invention is modified based on the current inspection system. Thus, FIGS. 1a-b and FIG. 2 can be referred to together. Based on the wiring structure as shown in FIGS. 1a-b, the switching line 23 is added thereto, and the switching transistor 24 is disposed on the switching line 23 so that the connection and/or disconnection between the input terminal and the output terminal of the switching transistor 24 is controlled according to the control signal.

In various embodiments, the wiring structure according to the present invention can be used as an inspection system for inspecting a display panel. It is intelligible that a liquid crystal display panel needs to be inspected for the yield rate by means of short bar technology before the liquid crystal display device is assembled. In one embodiment of the present invention, the inspection system is used for inspecting whether the liquid crystal display panel has defective pixels or bright dots by means of short bar technology. Preferably, at a data side of the structure as shown in FIG. 2, each of the R/G/B signal lines is correspondingly connected with each of the signal control lines (called testing lines in the inspection system) through ITO and the switching transistor 24. After connecting, the signal control lines can be introduced outward to connect with the corresponding probe for yield inspection.

Specifically, as shown in FIG. 2, when the wiring structure is used for inspecting the display panel, the control signal is input to the switching line 23, and the testing signal is input to the signal control lines, wherein the switching line 23 receives the control signal, and controls the switching transistor 24 according to the control signal so as to conduct the signal control lines and the corresponding signal lines, and the signal control lines are used for receiving the testing signal, and inspecting the signal lines connected correspondingly with the signal control lines according to the testing signal when the signal control lines and the corresponding signal lines are conducting.

It is easy to understand that the switching line 23 may comprise probes to input the control signal to the switching transistor 24, and the signal control lines may also comprise probes to input the testing signal, but they are not particularly limited thereto.

Figure 3:
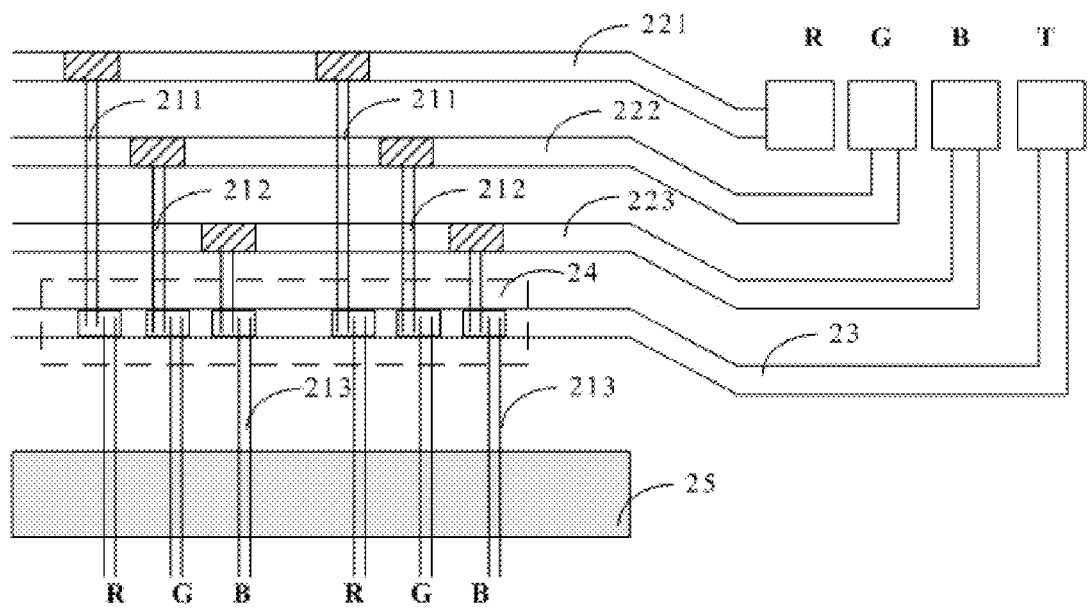
FIG. 3 is one schematic view of a wiring structure according to one embodiment of the present invention.

After inspecting, the switching line 23 receives the control signal, and the switching transistor 24 is controlled according to the control signal so as to disconnect the signal lines and the corresponding control signal lines, as shown in FIG. 3. Subsequently, the signal lines are soldered within a bonding area 25, and then the display panel can be operated normally.

From above description, the present invention provides a wiring structure based on the current inspection system, comprising a switching line 23 having a switching transistor 24 disposed thereon, and the connection and the disconnection between the input terminal and the output terminal of the switching transistor 24 are controlled according to the control signal, i.e. the connection and the disconnection between the signal control lines and the corresponding signal lines are controlled. The step of cutting off the signal lines by laser is canceled. When the wiring structure is used as an inspection system, the wiring structure can be reused, so that the manufacturing cost is greatly reduced, and the wiring structure is very convenient.

In various embodiments, the wiring structure present invention can be used for controlling a touch panel. It is intelligible that current capacitive touch panels can be classified into a self-capacitance type and a mutual capacitance type. There are two electrodes, i.e. Tx and Rx, in the mutual capacitance type; the Tx transmits signals, and the Rx receives signals. The capacitance value between Tx and Rx can be changed by touching objects (e.g. fingers) so that the position of the finger is able to be detected. There is only one electrode, i.e. Rx, in the self-capacitance type, and the capacitance value of the Rx can be changed by touching.

Figure 4:
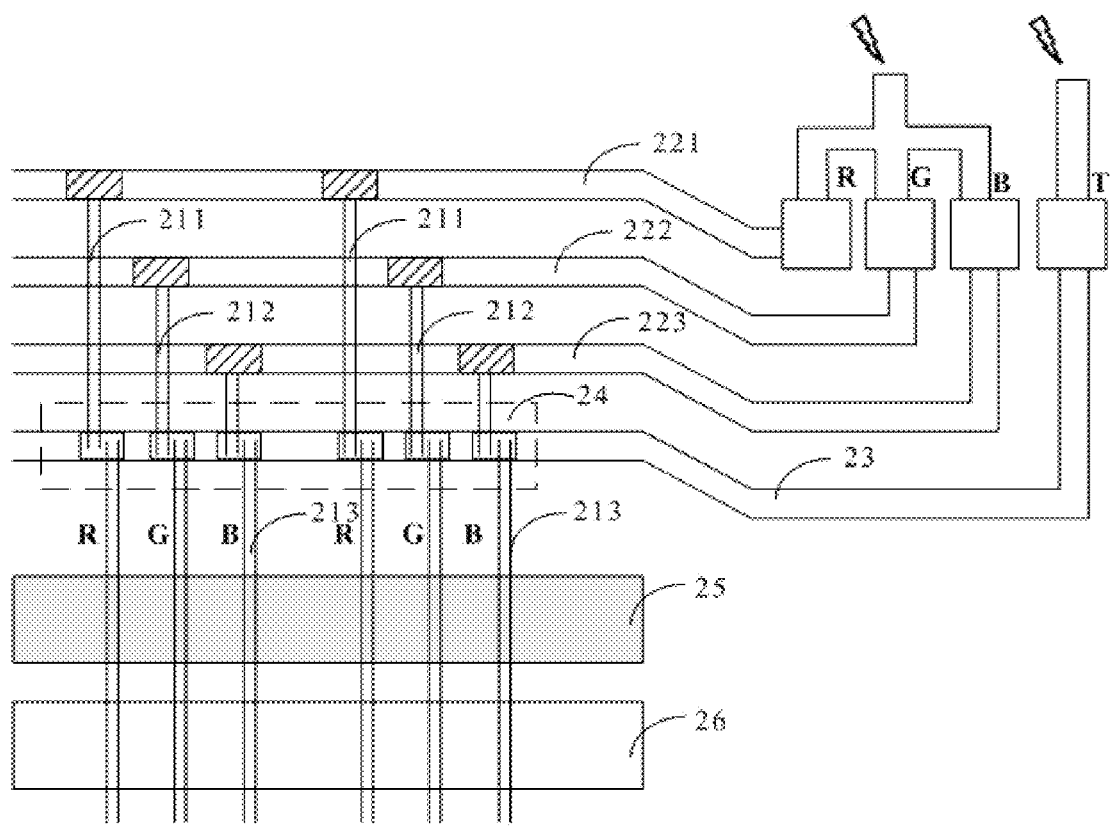
FIG. 4 is one schematic view of a wiring structure according to one embodiment of the present invention.

Specifically, refer to FIG. 4, which is one schematic view of a wiring structure used for controlling a touch panel according to the present invention. FIG. 4 shows that a control signal is inputted into the switching line 23, the control signal is received by the switching line 23, and the switching transistor 24 is controlled according to the control signal so that the signal control line and the corresponding signal lines are conducted. The signal lines are used for receiving and transmitting a touch signal Rx so that the touch signal Rx feeds back the signal control lines when the connection is present between the signal control lines and the signal lines, and the disconnection is present between pixels and a thin film transistor connecting thereto in the display panel 26.

Intelligibly, since the disconnection is present between the pixels and the thin film transistor in the display panel 26, the signal lines can be used for transmitting the touch signal Rx. When the connection is present between the input terminal and the output terminal of the switching transistor 24 on the switching line 23, and the touching objects (such as fingers) are applied on touch units (relative to the internal portion of the display panel 26), the touch signal Rx feeds back the signal control lines through the signal lines, that is, the touch control changes the capacitance value of Rx so that the touch position can be detected, the specific working procedure is not limited thereto.

Figure 5:
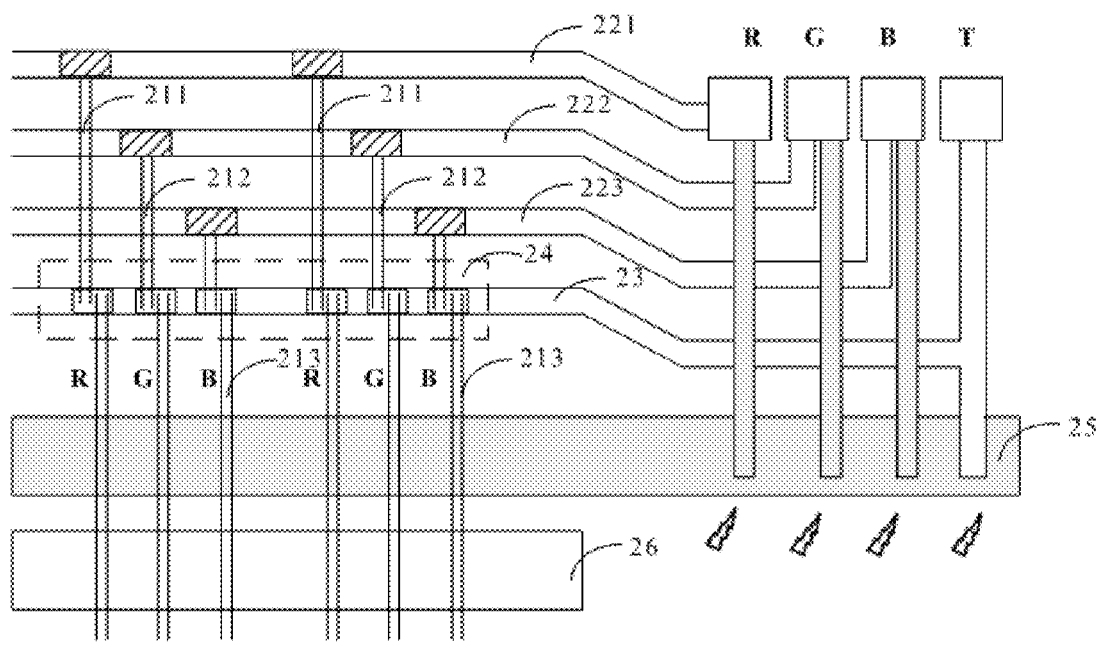
FIG. 5 is one schematic view of a wiring structure according to one embodiment of the present invention.

Refer to FIG. 5, which is one schematic view of a wiring structure used for controlling a touch panel according to the present invention. It is different from the wiring structure in FIG. 4, the wiring structure is further simplified by bonding the signal lines for touch control within the bonding area 25 when bonding the LCD signal lines without additional touch control lines.

The wiring structure in the present invention can be seen as a touch electrode design having LCD signal lines in combination with an inspection system, which is not limited in application to self-capacitance or mutual capacitance. The present invention takes only a self-capacitance as an example that only Rx receives signals for description, but it is not limited thereto. In the application of mutual capacitance, the signal lines in a partial area can be used as Tx, and the signal lines in another area can be used as Rx. Alternatively, the signal lines can be used as Rx, and the driving lines can be used as Tx similar to Rx; this is not specifically described here.

For the benefits of applying the wiring structure according to one embodiment of the present invention, the present invention further provides a display panel. The terms have the same meaning as mentioned in the wiring structure above. The details can be referred to the description of the embodiments of the wiring structure.

Figure 6:
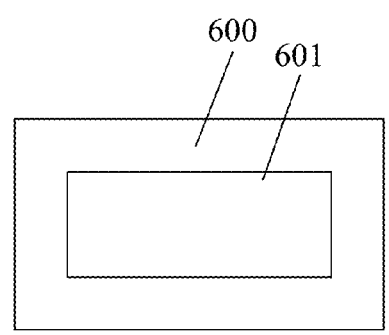
FIG. 6 is a schematic view of a display panel according to one embodiment of the present invention.

Refer to FIG. 6, which is a schematic view of a display panel 600 according to one embodiment of the present invention. The display panel 600 comprises a wiring structure 601, wherein the wiring structure 601 is the wiring structure mentioned in the above embodiments. Referring back to FIG. 2, the wiring structure 601 comprises:

Red, green, and blue (R/G/B) signal lines, three signal control lines, and a switching line 23 having a switching transistor 24 disposed thereon;

Wherein each of the RGB signal lines has a terminal connecting correspondingly to the switching transistor 24, and correspondingly connects with the signal control lines through the switching transistor 24;

The switching transistor 24 comprises a control terminal for receiving a control signal, and controls the connection or disconnection between the three signal control lines and the RBG lines according to the control signal.

As shown in FIG. 2, numeral 211 represents the R signal lines, numeral 212 represents the G signal lines, and numeral 213 represents the B signal lines. Because each of the signal lines connects with the signal control lines through the switching transistor 24, correspondingly, the signal control line 221 connects to the R signal line, the signal control line 222 connects to the G signal line, and the signal control line 223 connects to the B signal line.

It is understandable that the red, green, and blue signal lines are connected to the corresponding signal control lines by indium tin oxide ITO. Additionally, the switching transistor 24 can be a thin film transistor (TFT) or a metal-oxide-semiconductor field-effect transistor (MOSFET) in one embodiment of the present invention, but it is not limited thereto.

Preferably, the switching line 23 has a semiconductor layer disposed thereon, and the switching transistor 24 is disposed on the semiconductor layer. More preferably, the switching transistor 24 is a TFT transistor, and the switching line 23 may be simply referred to as T line. The TFT transistor comprises a control terminal, an input terminal, and an output terminal. The switching line 23 inputs a control signal to the control terminal of each TFT transistor, and controls the connection and/or disconnection between the input terminal and the output terminal according to the control signal.

It is easy to understand that the connecting relationship between the control terminal, the input terminal, and the output terminal of the switching transistor 24 is not limited specifically. Any of the configurations can be adopted as long as the connection between the signal control lines and the signal lines can be achieved by conducting the input and the output terminal, or the disconnection between the signal control lines and the signal lines can be achieved by disconnecting the input and the output terminal according to the control signal received by the control terminal.

It is understandable that the wiring structure according to the present invention is modified based on the current inspection system. Thus, FIGS. 1a-b and FIG. 2 can be referred to together. Based on the wiring structure as shown in FIGS. 1a-b, the switching line 23 is added thereto, and the switching transistor 24 is disposed on the switching line 23 so that the connection and/or disconnection between the input terminal and the output terminal of the switching transistor 24 is controlled according to the control signal.

In various embodiments, the wiring structure according to the present invention can be used as an inspection system for inspecting a display panel. When the wiring structure is used for inspecting the display panel, the control signal is input to the switching line 23, and the testing signal is input to the signal control lines, wherein the switching line 23 receives the control signal, and controls the switching transistor 24 according to the control signal so as to conduct the signal control lines and the corresponding signal lines, and the signal control lines are used for receiving the testing signal, and inspecting the signal lines connected correspondingly with the signal control lines according to the testing signal when the signal control lines and the corresponding signal lines are conducting.

In various embodiments, the wiring structure of the present invention can be used for controlling a touch panel. The switching line 23 receives the control signal and controls the switching transistor 24 according to the control signal so as to conduct the signal control lines and the corresponding signal lines. The signal lines are used for receiving and transmitting a touch signal Rx so that the touch signal Rx feeds back the signal control lines when the connection is present between the signal control lines and the signal lines, and the disconnection is present between pixels and a thin film transistor connecting thereto in the display panel 26.

From the above description, the present invention provides a wiring structure based on the current inspection system, comprising a switching line 23 having a switching transistor 24 disposed thereon, and the connection and the disconnection between the input terminal and the output terminal of the switching transistor 24 are controlled according to the control signal, i.e. the connection and the disconnection between the signal control lines and the corresponding signal lines are controlled. The step of cutting off the signal lines by laser is canceled. When the wiring structure is used as an inspection system, the wiring structure can be reused, so that the manufacturing cost is greatly reduced, and the wiring structure is very convenient. Moreover, the wiring structure in the present invention can be seen as a touch electrode design having LCD signal lines in combination with inspection system for controlling a touch panel.

In above embodiments, every embodiment has its emphasis. The portions without detailed description in embodiments can be referred to the relative details in its context, and are not repeated here.

It will be understood by one skilled in the art that the word "preferable" means "example", "instance", or "illustration" in the specification. The aspects or designs described as being "preferable" are not essentially explained as being advantageous thereto. On the contrary, the word "preferable" is for proposing a concept specifically. The term "or" will be understood to imply the inclusion of stated elements but not the exclusion of any other elements in the application. That is, unless explicitly described to the contrary, "X uses 101 or 102" means that the inclusion of one of any arrangement, i.e. X uses 101, X uses 102, or X uses 101 and 102 both, "X uses 101 or 102" can be satisfied by any of the above examples.

Moreover, although the present publication is illustrated and described by one or more embodiments, one skilled in the art will expect equivalent variations and modifications by understanding and reading based on the specification and the accompanying drawings. The present invention includes all these modifications and variations, and is limited only by the appended claims. Especially regarding various functions performed by the abovementioned components (such as elements, resources, etc.), the terms for describing these components mean that the specific functions (e.g. the functions of the components are equivalent) can be performed by any component (unless explicitly described), even though the structure is different from the structure disclosed in the specification for performing the same function. In addition, although the specific features correspond to only one of the embodiments in the present publication, the specific features can be expected to combine with one or more features in practice if it is advantageous to the specific features. Furthermore, in the specification, unless explicitly described to the contrary, the word "comprise" and variations such as "comprises" or "comprising" will be understood to imply the inclusion of stated elements but not the exclusion of any other elements.

The present invention has been described with preferred embodiments thereof and it is understood that many changes and modifications to the described embodiments can be carried out without departing from the scope and the spirit of the invention that is intended to be limited only by the appended claims.

What is claimed is:

1. A wiring structure for a display panel, comprising:
   RGB signal lines;
   three signal control lines; and
   a switching line including a semiconductor layer, wherein a switching transistor is disposed on the semiconductor layer;
   wherein each of the RGB signal lines has a terminal connected to the switching transistor, and correspondingly connected to the signal control lines through the switching transistor;
   wherein the switching transistor comprises a control terminal for receiving a control signal, and controls a connection or a disconnection between the three signal control lines and the RGB lines according to the control signal;
   wherein, in inspecting the display panel by using the wiring structure, the signal control lines are used for receiving a test signal when the signal control lines are connected to the RGB signal lines, and then the signal control lines perform a test on the RGB signal lines connected thereto according to the test signal;

wherein, in controlling a touch panel by using the wiring structure, the RGB signal lines are used for receiving and transmitting a touch signal so that the touch signal feeds back the signal control lines when the signal control lines are connected to the RGB signal lines, and pixels are disconnected from a thin film transistor connecting thereto in the display panel.

2. The wiring structure according to claim 1, wherein the switching transistor is a thin film transistor or a metal-oxide-semiconductor field-effect transistor.

3. A wiring structure for a display panel, comprising:

RGB signal lines;

three signal control lines; and a switching line having a switching transistor disposed thereon;

wherein each of the RGB signal lines has a terminal connected to the switching transistor, and correspondingly connected to the signal control lines through the switching transistor;

wherein the switching transistor comprises a control terminal for receiving a control signal, and controls a connection or a disconnection between the three signal control lines and the RGB signal lines according to the control signal;

wherein, in controlling a touch panel by using the wiring structure, the RGB signal lines are used for receiving and transmitting a touch signal so that the touch signal feeds back the signal control lines when the signal control lines are connected to the RGB signal lines, and pixels are disconnected from a thin film transistor connecting thereto in the display panel.

4. The wiring structure according to claim 3, wherein the switching line includes a semiconductor layer, and the switching transistor is disposed on the semiconductor layer.

5. The wiring structure according to claim 3, wherein the switching transistor is a thin film transistor or a metal-oxide-semiconductor field-effect transistor.

6. A display panel having a wiring structure, wherein the wiring structure comprises:

RGB signal lines;

three signal control lines; and a switching line having a switching transistor disposed thereon;

wherein each of the RGB signal lines has a terminal connected to the switching transistor, and correspondingly connected with the signal control lines through the switching transistor;

wherein the switching transistor comprises a control terminal for receiving a control signal, and controls a connection or a disconnection between the three signal control lines and the RGB signal lines according to the control signal;

wherein, in controlling a touch panel by using the wiring structure, the RGB signal lines are used for receiving and transmitting a touch signal so that the touch signal feeds back the signal control lines when the signal control lines are connected to the RGB signal lines, and pixels are disconnected from a thin film transistor connecting thereto in the display panel.

7. The display panel according to claim 6, wherein, in inspecting the display panel by using the wiring structure, the signal control lines are used for receiving a test signal when the signal control lines are connected to the RGB signal lines, and then the signal control lines perform a test on the RGB signal lines connected thereto according to the test signal.

8. The display panel according to claim 6, wherein the switching line includes a semiconductor layer, and the switching transistor is disposed on the semiconductor layer.

9. The display panel according to claim 6, wherein the switching transistor is a thin film transistor or a metal-oxide-semiconductor field-effect transistor.

* * * * *